United States Statutory Invention Registration [19]

[11] Reg. Number: H347

Layden et al. [43] Published: Oct. 6, 1987

[54] ALUMINA FIBER REINFORCED LITHIUM ALUMINOSILICATE

[75] Inventors: George K. Layden, Hartford; Karl M. Prewo, Vernon, both of Conn.

[73] Assignee: The United States of America as represented by the Secretary of the Air Force, Washington, D.C.

[21] Appl. No.: 883,417

[22] Filed: Jul. 8, 1986

[51] Int. Cl.[4] ..... B32B 5/12
[52] U.S. Cl. ..... 428/113; 428/294
[58] Field of Search ..... 428/357, 361, 379, 385, 428/388, 389, 902; 501/8, 32, 68

[56] References Cited

U.S. PATENT DOCUMENTS

| | | | |
|---|---|---|---|
| 3,828,699 | 8/1974 | Bowen | 109/80 |
| 3,962,514 | 6/1976 | Rittler | 501/8 X |
| 4,192,688 | 3/1980 | Babcock et al. | 501/68 X |
| 4,324,843 | 4/1982 | Brennan et al. | 428/697 |
| 4,324,843 | 4/1982 | Brennan et al. | 428/367 X |
| 4,412,854 | 12/1983 | Layden | 428/902 X |
| 4,428,763 | 1/1984 | Layden | 428/902 X |
| 4,485,179 | 11/1984 | Brennan et al. | 501/32 |
| 4,485,179 | 11/1984 | Brennan et al. | 428/902 X |
| 4,486,490 | 12/1984 | Patz et al. | 428/902 X |
| 4,615,987 | 10/1986 | Chyung et al. | 501/8 |

*Primary Examiner*—John F. Terapane
*Assistant Examiner*—Eric Jorgensen
*Attorney, Agent, or Firm*—Charles E. Bricker; Donald J. Singer

[57] ABSTRACT

A hot pressed, fiber reinforced matrix composite consisting essentially of a plurality of alumina fibers in a lithium aluminosilicate glass matrix. The composite is fabricated by hot pressing alumina fibers impregnated with lithium aluminosilicate glass frit and heat treating the hot pressed composite at an elevated temperature for 12 to 36 hours.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ALUMINA FIBER REINFORCED LITHIUM ALUMINOSILICATE

RIGHTS OF THE GOVERNMENT

The invention described herein may be manufactured and used by or for the Government of the United States for all governmental purposes without the payment of any royalty.

BACKGROUND OF THE INVENTION

This invention relates to a fiber reinforced structural material. More specifically, this invention relates to a composite structure comprised of high strength alumina fibers in a glass matrix.

Fiber reinforced organic matrix composites are widely used and accepted as structural materials because of their desirable attributes of high strength, high modulii and low density. In general, most of these composites comprise an organic polymer matrix, such as an epoxy resin, a polyimide, a polycarbonate, or similar material. The matrices are reinforced with a wide variety of fibers including glass, carbon, graphite and boron. However, even the best of these composites are limited to an operational temperature below about 300° F. (150° C.).

The severe environment encountered by advanced missile systems precludes the use of organic matrices. Radomes for such systems must have acceptable resistance to rain and particle erosion as well as high thermal stability and thermal shock resistance. Generally, ceramic materials meet one or more of these requirements. One further requirement for radomes, that being transparency to X band radiation, precludes the use of certain ceramic materials. Silicon carbide yarn reinforced glass and glass ceramic composites, although very strong, tough, and environmentally stable, have been found to be essentially opaque to X band radiation. Other materials, such as boron nitride reinforced glass and glass ceramic composites, and X band transparent, but are extremely weak and brittle.

In general, the problem of developing tough ceramic fiber-glass or -glass ceramic matrix composites lies with bonding between the fibers and the matrix. In conventional resin matrix composites, such as glass fiber reinforced polyester and carbon fiber reinforced epoxy, toughness is provided by the ability of the system to divert advancing cracks into the fiber-matrix interface, resulting in debonding of fibers and matrix, thus providing an additional energy absorption mechanism by fiber pull-out in the wake of an advancing crack. This results in the so-called "brushy" appearance of the fracture surface of a typical fiber reinforced composite.

In many, if not most ceramic fiber reinforced glass and ceramic matrix composites, bonding between the fibers and the matrices is too strong to permit debonding and fiber pull-out. Consequently, advancing cracks propagate from the matrix into and across the fibers with little or no diversion, thus resulting in a brittle type of fracture.

The problem of defeating too strong a bond formation may, in some instances, be addressed by the application of coatings or films to the fibers which do not bond well to the matrix. The types of materials which are effective in at least partially debonding the ceramic fibers from the matrix material are electrically conductive, which degrade the dielectric properties of the composite.

Thus, what is desired is a composite material which exhibits superior strength and toughness, high thermal stability and is transparent to X band radiation.

Accordingly, it is an object of the present invention to provide an improved ceramic fiber, glass matrix composite material.

It is another object of the invention to provide a method for fabricating an improved ceramic fiber glass matrix composite material.

Other objects and advantages of the present invention will be readily apparent upon consideration of the following detailed description of the invention.

SUMMARY OF THE INVENTION

In accordance with the present invention there is provided an improved hot-pressed, ceramic fiber, glass matrix composite consisting essentially of a plurality of oriented alumina fibers and a lithium aluminosilicate glass matrix. This improved composite is fabricated by impregnating an alumina tow consisting of a plurality of alumina fibers with a slurry containing finely divided lithium aluminosilicate glass particles, winding the tow in a single layer on a drum to form a tape, drying and cutting the thus formed tape into segments or sheets of predetermined shape, placing a plurality of layers of such sheets into a die, hot pressing the plurality of layers to form the composite structure, and heat treating the hot-pressed structure.

DESCRIPTION OF PREFERRED EMBODIMENTS

Alumina fibers are available from E.I. DuPont de Nemours, Inc., Wilmington, DE. The DuPont fiber, referred to as FP, is a continuous length yarn having 210 fibers per tow, with a round cross section, about 20 μm diameter.

Glass-ceramics having base compositions within the lithium aluminosilicate system are well known to the art. Such compositions demonstrate low coefficients of thermal expansion, and hence, are particularly advantageous in those applications where thermal shock resistance is a major concern. Such compositions are capable of use in high temperature applications, viz., in excess of 1000° C., and, with minor additions of such compatible metal oxides as BaO and MgO, at temperatures up to 1200° C.

The preferred lithium aluminosilicate glasses have the composition, expressed in terms of weight percent, of:

| | |
|---|---|
| $Li_2O$ | 1.5–5.0 |
| $Al_2O_3$ | 15–25 |
| $SiO_2$ | 60–75 |
| $As_2O_3$ | 0.5–3.0 |
| $Ta_2O_5$ | 0–10 |
| $Nb_2O_5$ | 0–10 |
| $Ta_xO_5 + Nb_2O_5$ | 1–10 |
| $ZrO_2$ | 1–5 |
| MgO | 0–10 |

with the preferred level of $Li_2O$ being 2–3.5%.

Several methods exist for the fabrication of a fiber reinforced glass composite. The simplest and lowest cost method consists of pulling the fiber tow through a slurry containing finely divided glass particles. The coated fiber tow is wound in a single layer on a drum to form a continuous tape, dried, then the tape cut into sheets of a desired size. The sheets are placed in a suitable die to provide unidirectional or cross-plied fiber alignment and then hot pressed.

The glass slurry consists essentially of the aforementioned finely divided glass, a carrier liquid and, optionally, an organic binder. Use of the binder is preferred to simplify handling of the impregnated tow as well as the dried sheet. Typically the glass slurry may contain about 200 g of glass frit, 100 ml of a binder, such as Rhoplex, an acrylic latex available from Rhom and Haas, Inc. Philadelphia, PA. and 500 ml of water. The carrier liquid can be water, a lower alkyl alcohol, or the like. While coating tow, the slurry should be kept agitated using suitable agitation means, such as a magnetic stirrer.

The hot pressing may be carried out in a vacuum or under an inert atmosphere, such as He or Ar, at pressures of 1000 to 4000 psi and temperatures of about 1300° to 1600° C. If an organic binder is employed in fabricating the fiber/glass type, the binder is removed by heating the stack of sheets in air at an elevated temperature of about 400° to 750° C. for about 1 to 5 hours prior to hot pressing the stack.

Following hot pressing, the consolidated material is heat treated by heating the material to an elevated temperature in the range of about 750° to 1000° C. and holding the temperature at that temperature for about 12 to 48 hours.

The procedure for assembling the alumina fiber reinforced glass matrix composite consists of several processes, each with its own variables. In making the glass coated alumina fiber tape, the speed at which the fiber tow is moved through the slurry, the amount of glass in the slurry, the organic constituent(s) of the slurry, and their proportions can all be varied. In cutting the tape and stacking it into the die, the number of layers must be determined experimentally. In the hot pressing operation, the temperature(s) for outgassing, the organic material(s), the hot pressing temperature, pressure, atmosphere, dwell time, and the temperature to which the die is cooled before the pressure is released must be determined. Similarly, in the post-hot pressing heat treatment operation, the time, temperature and heating and cooling rates must be determined.

The following examples illustrate the invention:

Example I

DuPont alumina tow, Type FP, was unspooled and passed through a slurry containing 2 g of −325 mesh lithium aluminosilicide glass powder and 1 ml Rhoplex acrylic latex per 5 ml of water carrier. The slurry-impregnated tow was wound onto an octagonal mandrel covered with a layer of polyester separation film. The take-up mandrel and its drive motor were mounted on a transverse table, and the speed of rotation and the speed of transverse could be controlled independently, so that successive windings of the tow could be closely juxtaposed so as to form a well collimated tape. The tape was dried using a heat lamp or hot air source. The mandrel was rotated during drying to prevent the slurry from draining from the fibers.

When the fiber/glass/latex tape was dry, it was removed from the mandrel and cut into 7.6×7.6 cm. square sheets. The polyester film was stripped from the sheets, and the squares were then stacked into stainless steel jigs. A portion of the sheets were stacked in jibs with the fibers all aligned so as to produce an uniaxial (0° orientation) composite. Another portion of the sheets were stacked in jigs so as to produce a 90° biaxial composite, with each new sheet placed so that the fibers were 90° relative to the fibers of the preceding sheet. Yet another portion of sheets were stacked with ±45° orientation. Typically, 20 to 24 layers of the alumina fiber/glass tape were stacked to produce a composite plate which, after hot pressing, had a thickness of about 2.5 to 4.8 mm.

The jigs containing the stacks of aligned tape sheets were placed in an air furnace and heated at 500° C. for 2 hours, then the temperature was raised to 700° C. and held for about 30 min. This heat treatment was adequate to decompose and remove the temporary organic binder from the stacked sheets without damaging the fibers or disturbing the distribution of glass frit around the individual yarn strands. The resulting stacks of aligned, but unconsolidated, composite material were stored in the jigs until transferred to the hot pressing die.

Hot pressing was carried out under the conditions given in the following table. The temperatures are those recorded by the furnace control thermocouple which was located in close proximity to the hot pressing mold. The mold temperature was initially raised to 750° C. and held there for 20 to 30 minutes to permit outgassing of the furnace chamber and the sample. If an atmosphere other than vacuum were to be used during hot pressing, it was introduced into the furnace chamber toward the end of this hold period. $T_1$ is the pressing temperature, i.e., the temperature at which pressure P was applied to the mold ram, and $T_2$ is the temperature during cooldown at which pressure was removed. Time $t_1$ was the soak period at $T_1$ to allow the interior of the mold to approach $T_1$. Time $t_2$ is the time, under pressure P, at nominal temperature $T_1$. If the hot pressing was done under vacuum, the chamber was backfilled with helium at the end of time $t_2$ to accelerate cool down. Time $t_3$ is the duration of a temperature hold at $T_2$ during cooldown, before pressure was removed at $T_2$.

Certain of the samples were heat treated following hot pressing, by heating in air at 900° C. for 24 hours.

The 3 point flexure strength tests were conducted at room temperature using a span to depth ratio of 25:1 and a loading rate of 0.005"/min.

Fabrication data are presented in the following table:

TABLE I

Sample Fabrication Data

| Sample No. | No. of layers | Orientation | Furnace Atmosphere Pressing | Furnace Atmosphere Cooldown | $T_1$ (°C.) | P (Ksi) | $t_1$ (min) | $t_2$ (min) | $T_2$ (°C.) | $t_3$ (min) | Heat Treated | Mean 3 Pt Flex Strength MPa | Mean 3 Pt Flex Strength Ksi |
|---|---|---|---|---|---|---|---|---|---|---|---|---|---|
| 1079 | 26 | 0° | Vac. | He | 1450 | 1 | 15 | 15 | 500 | 0 | | 235 | 34 |
| 1123 | 24 | 0° | Ar | Ar | 1450 | 2 | 15 | 3 | 1000 | 0 | | 235 | 34 |
| 1123H | 24 | 0° | Ar | Ar | 1450 | 2 | 15 | 3 | 1000 | 0 | Yes | 269 | 39 |
| 1164H | 24 | 0°/90° | Ar | Ar | 1450 | 2 | 10 | 3 | 1000 | 0 | Yes | 103 | 18 |

TABLE I-continued

Sample Fabrication Data

| Sample No. | No. of layers | Orientation | Furnace Atmosphere Pressing | Furnace Atmosphere Cooldown | $T_1$ (°C.) | P (Ksi) | $t_1$ (min) | $t_2$ (min) | $T_2$ (°C.) | $t_3$ (min) | Heat Treated | Mean 3 Pt Flex Strength MPa | Mean 3 Pt Flex Strength Ksi |
|---|---|---|---|---|---|---|---|---|---|---|---|---|---|
| 1173H | 20 | ±45° | AR | Ar | 1450 | 2 | 10 | 5 | 900 | 0 | Yes | 117 | 17 |
| 2109H | 24 | 0° | Vac. | He | 1300 | 1 | 10 | 5 | 600 | 0 | Yes | 186 | 29 |

Comparison of the mean 3 point flexural strength for samples 1123 and 1123H clearly shows the increase in strength achieved by a post-hot pressing heat treatment.

Example II

Elevated temperature 3 point flexure tests were conducted on samples prepared and heat treated as described in Example I for sample no. 1123H. The mean flexural strengths and test temperatures are given in Table II:

TABLE II

| Test Temperature (°C.) | Flexural Strength (psi) |
|---|---|
| 25 | 39,000 |
| 1000 | 37,000 |
| 1200 | 17,000 |

Example III

A specimen measuring 0.90"×0.40"×0.10", was cut from a piece of sample no. 1079 (Example I). This specimen was tested for dielectric constant loss tangent at a frequency of 10.5 GHz. These were determined to be 6.6 and 0.015, respectively.

Various modifications and alterations may be made without departing from the spirit of the invention or the scope of the appended claims.

We claim:

1. A method for fabricating a fiber reinforced glass matrix composite which comprises the steps of:

(a) pulling a tow of alumina having a plurality of fibers in parallel relationship through an agitated slurry consisting essentially of a finely divided lithium aluminosilicate glass, a carrier liquid and an organic binder, in order to impregnate said tow;

(b) drying and cutting said impregnated tow into a sheet of predetermined shape;

(c) placing a plurality of layers of said sheet into a die;

(d) hot pressing said layers at a temperature and pressure sufficient to form said reinforced composite; and (e) heat treating the resulting composite structure at an elevated temperature below the softening point of said glass for about 12 to 36 hours.

2. The method of claim 1 wherein said composite is hot pressed for about 10 to 120 minutes at a temperature of about 1000° to 1500° C. and a pressure of about 1000 to 4000 psi, and wherein the resulting composite is heat treated at a temperature in the range of about 750° to 1000° C. for about 12 to 48 hours.

3. The method of claim 2 wherein said hot pressing is carried out at a temperature of about 1300° to 1450° C. for about 13 to 30 minutes and said heat treatment is carried out at about 900° C. for about 24 hours.

4. The method of claim 1 wherein said liquid carrier in said glass slurry is water and wherein said binder is a water soluble acrylic latex.

5. The method of claim 4 wherein the composition of said glass slurry is about 0.4 g of said glass and about 0.2 ml of said binder per ml of said carrier liquid.

6. The method of claim 1 wherein said plurality of sheet layers are oriented in the same direction.

7. The method of claim 1 wherein said plurality of layers are placed in said die with the fibers of each sheet laid at right angles to the fibers of each adjacent sheet.

8. A hot pressed, fiber reinforced matrix composite consisting essentially of a plurality of layers of parallelly oriented alumina fibers in a lithium aluminosilicate glass matrix.

9. The composite of claim 8 wherein said alumina fibers are unidirectional.

10. The composite of claim 8 wherein said alumina fibers are arranged in layers and wherein the orientation of fibers in a layer is unidirectional and wherein the orientation of adjacent layers is 90°.

* * * * *